've# 2,912,399

PROCESS FOR PREPARING AQUEOUS EMULSIONS

Herbert Bartl, Koln-Stammheim, Germany, assignor to Farbenfabriken Bayer Aktiengesellschaft, Leverkusen, Germany, a corporation of Germany No Drawing. Application August 9, 1954
Serial No. 448,747

Claims priority, application Germany August 11, 1953

11 Claims. (Cl. 260—27)

The present invention relates to a process for preparing aqueous emulsions with the aid of water-insoluble high-molecular weight emulsifiers and to new emulsifiers employed in this process.

In general, water-soluble emulsifiers are employed for preparing aqueous emulsions. Examples of these emulsifiers are the alkali-metal salts of fatty acids, alkyl sulfates and alkyl-aryl-sulfonates. Compounds of high molecular weight the alkali salts of which are soluble in water are also employed, for instance the copolymers from water-insoluble vinyl compounds and acrylic acid, methacrylic acid, maleic anhydride, or mono-esters of fumaric acid and maleic acid. Emulsions prepared with the aid of the afore-said emulsifiers are used for impregnating, dressing, seasoning or hydrophobing textiles or leather, furthermore, for producing paints, coatings and films. The water-proofing action adversely affected, however, by the emulsifiers left in the coatings or impregnations thus produced.

In accordance with the present invention it has been found that impregnations, coatings and paints of extraordinary waterproofness can be obtained with the aid of emulsions prepared from high-molecular weight water-insoluble emulsifiers obtainable by copolymerizing polymerizable, water-insoluble vinyl compounds with polymerizable acids of the type R–CH=CX–CO–OH, wherein X stands for hydrogen, alkyl or halogen, and R for COOR', CONHR' or CONR'R", R' and R" being alkyl radicals containing more than 8 carbon atoms. The ratio of the components employed in the polymerization reaction is to be chosen so that the alkali metal salts of the resulting copolymers are water-insoluble. The copolymers from polymerizable mono-esters of ethylene-$\alpha$-$\beta$-dicarboxylic acids with fatty alcohols containing more than 8 carbon atoms have proved to be particularly suitable according to the invention. As water-insoluble polymerizable vinyl compounds there may be used the most various types. Especially suitable are styrene and substituted styrenes. The copolymers of ethylene-$\alpha$-$\beta$-dicarboxylic acid monoesters with water-insoluble polymerizable vinyl compounds such as styrene, are preferably employed in the molecular ratio 1:1 to 1:2.

The copolymers may be produced in the most different manners, in bulk, solution or emulsion. The new high-molecular weight emulsifiers basically differ from the known high-molecular weight dispersion agents the salts of which are water-soluble, in that their salts are water-insoluble. It is a surprising feature of the invention that the said copolymers are excellent emulsifiers in spite of their insolubility in water.

Because of the water-insolubility of the polymers the emulsions are preferably prepared as follows: whereas in the conventional process (in the conventional method) the emulsifier is dissolved in the aqueous phase, the emulsifiers in accordance with the invention are dissolved in the organic solvents immiscible with water. An emulsion results by intensely shaking or stirring the solution with the aqueous phase containing alkali in an amount sufficient to neutralize, wholly or in part, the carboxyl groups of the emulsifier.

In the above manner emulsions of hydrocarbons in water and vice versa can be prepared. The organic solvents may contain other substances dissolved therein. Additives may be incorporated in the aqueous phase, for instance pigments dispersed in water. The new emulsifiers can thus be used to prepare emulsions which are suitable for impregnating, finishing, seasoning, hydrophobing, painting or improving the quality of, leather, paper or textiles.

It is also possible to carry out emulsion polymerisations with the aid of the new emulsifiers. The polymers thus obtained can be used for producing solutions, films, plastics and moldings either in the form of latex or after separating and drying without removing the emulsifier. The properties of the polymers are frequently improved by the carboxyl groups present in the high-molecular weight emulsifier remaining in the polymers. For instance the adhesion of the polymers to substrates can be increased or the drying properties of the plastics improved. The mechanical properties of the polymers can also be improved by cross-linking the carboxyl groups of the emulsifier for instance with polyvalent cations, alcohols, amines or methylol compounds. It is of course possible to complementarily use conventional emulsifiers in the preparation of the emulsion polymers.

The present invention is further illustrated by the following examples without being restricted thereto, the parts given being by weight if not otherwise stated.

Example 1

50 parts of a copolymer prepared from 284 parts of maleic acid mono-dodecylester and 125 parts of styrene are dissolved in 150 parts by volume of xylene and intimately mixed with a solution of 300 parts of isomerized rubber prepared by the process described in copending application Ser. No. 416,714, filed March 16, 1954, by Herbert Bartl and Wilhelm Becker, in 700 parts by volume of xylene. The homogeneous solution is intensely shaken with 600 parts by volume of water containing 40 parts by volume of 1-N-sodium hydroxide solution. A stable emulsion results.

Example 2

60 parts of a copolymer prepared from 368 parts of maleic acid-mono-octadecylester and 115 parts of styrene are dissolved in 200 parts by volume of trichloroethylene containing 20 parts by volume of acetone. The solution is intimately mixed with another solution consisting of 300 parts of isomerized rubber prepared in the copending application referred to in Example 1, 120 parts of chlorinated diphenyl (59% chlorine content) as plasticiser and 700 parts by volume of xylene. By shaking the homogeneous solution with 600 parts by volume of water containing 40 parts by volume of 1-N-sodium hydroxide solution a stable emulsion results.

Example 3

100 parts of a copolymer prepared from 284 parts of fumaric acid mono-dodecylester and 125 parts of styrene are dissolved in 300 parts of trichloroethylene containing 30 parts by volume of acetone. The emulsifier solution is mixed with a hot solution (70° C.) of 200 parts of paraffin in 300 parts by volume of trichloroethylene, and emulsified with 700 parts by volume of a 0.1-N-sodium hydroxide solution.

Example 4

100 parts of a copolymer prepared from 184 parts of maleic acid mono-octadecylester and 70 parts of styrene are dissolved in 350 parts of styrene having incorporated 50 parts of acetone. The solution is mixed in a pressure vessel with 3000 parts by volume of water containing 50 parts by volume of 1-N-sodium hydroxide solution, 3 parts of potassium persulfate and 2 parts of the sodium salt of a sulfinic acid of long-chain paraffins. 650 parts of butadiene are then added. The emulsion is stirred or shaken in a stream of nitrogen at 40° C. for 50 hours. The resulting latex is freed from gas bubbles and filtered. The polymer can be precipitated by adding salt solutions of polyvalent cations for instance an aluminum sulfate solution or a saturated common salt solution.

*Example 5*

60 parts of a copolymer prepared from 284 parts of maleic acid mono-dodecylester and 125 parts of styrene are dissolved in a mixture of 700 parts of methyl methacrylate and 300 parts of butyl acrylate. The solution is shaken under nitrogen in a vessel with 3000 parts by volume of water containing 40 parts by volume of 1-N-sodium hydroxide solution, and 2 parts of potassium persulfate at 40° C. for 48 hours. A solid polymer is obtained, which can be dried to form a very fine powder.

*Example 6*

60 parts of a copolymer prepared from 184 parts of maleic acid mono-octadecylester and 70 parts of styrene are dissolved in 1000 parts of methyl methacrylate, and emulsified with 3000 parts by volume of water containing 40 parts by volume of 1-N-sodium hydroxide solution and 2 parts of potassium persulfate.[1] A pasty mass is obtained, which is dried to a very fine powder.

*Example 7*

100 parts of a copolymer prepared from 368 parts of maleic acid mono-octadecylester and 125 parts of styrene are dissolved in 800 parts of vinylidene chloride. 200 parts of acrylonitrile and 3000 parts by volume of water containing 70 parts by volume of 1-N-sodium hydroxide solution and 2 parts of potassium persulfate are added to the solution. The emulsion is stirred in a pressure vessel under nitrogen at 40° C. for 48 hours. A stable emulsion results which can be precipitated by addition of acetic acid. The dried polymer is soluble in tetrahydrofurane.

*Example 8*

60 parts of a copolymer prepared from 70 parts of maleic acid monostearylamide and 24 parts of styrene (or 60 parts of a copolymer prepared from 65 parts of maleic acid monooctadecylester and 35 parts of isopropylstyrene) are dissolved in 200 parts by volume of xylene. The solution is intimately mixed with another solution consisting of 300 parts of isomerized rubber, 120 parts of chlorinated diphenyl as plasticiser and 700 parts by volume of xylene. By shaking the homogeneous solution with 600 parts by volume of water containing 40 parts by volume of 1-N-sodium hydroxide solution an emulsion results.

*Example 9*

10 parts of a copolymer prepared from 65 parts of maleic acid mono-octadecylester are dissolved in 55 parts of styrene. The solution is intensely mixed in a pressure vessel provided with a stirrer with 212 parts of water, 8 parts of 1-N-sodium hydroxide solution, 0.5 part of potassium persulfate, 0.2 part of triethanolamine, 0.1 part of doedecylmercaptane, 10 parts of acrylonitrile and 35 parts of butadiene, and polymerized at 30° C. until a yield of 80% is obtained. The resulting emulsion of the polymer is freed from residual amounts of the monomeric compounds by treatment with steam. Upon drying the filtered latex forms solid, transparent films and can be used for preparing coatings and paints.

---

[1] The emulsion is shaken with the exclusion of air at 40° C. for 24 hours.

*Example 10*

8 parts of a copolymer prepared from 55 parts of maleic acid monooctadecylester, 10 parts of the acid ester of maleic acid and abietic alcohol, 20 parts of styrene and 15 parts of butyl acrylate are dissolved in 15 parts of styrene and 20 parts of butylacrylate. The solution is intensely mixed in a pressure vessel, which is provided with a stirrer, with 210 parts of water, 6 parts of 1-N-sodium hydroxide solution, 0.3 part of potassium persulfate, 0.1 part of triethanolamine, 0.1 part of dodecylmercaptane, 0.5 part of an alkanesulfonate ($C_{12}$–$C_{18}$), 15 parts of acrylonitrile, and 50 parts of buatdiene and then polymerized at 30° C. for 24 hours. After being freed from residual amounts of the monomeric compounds the filtered latex is dried to form elastic transparent films and can be used for impregnating fabrics and other materials.

I claim:

1. As a novel aqueous emulsion, a continuous phase and a dispersed organic phase, the latter comprising (a) a liquid polymerizable ethylenically unsaturated monomer and (b) an emulsifier consisting of a water-insoluble alkali metal salt of a copolymer of 1–2 moles of styrene with about 1 mole of a polymerizable acid having the general formula R—CH=CX—COOH, wherein X is a member selected from the group consisting of hydrogen, alkyl and halogen, and R is a member selected from the group consisting of —COOR',

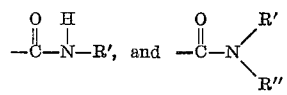

in which R' and R'' stand for alkyl radicals containing at least 12 carbon atoms.

2. The emulsion of claim 1 wherein said emulsifier is a water-insoluble alkali metal salt of a copolymer of 1–2 moles of styrene and a monoalkyl metal ester of an ethylene-alpha,beta-dicarboxylic acid and an alcohol of at least 8 carbon atoms.

3. The emulsion of claim 1 wherein said emulsifier is a water-insoluble alkali metal salt of a copolymer of 1–2 moles of styrene with about 1 mole of a monoalkyl amide of an ethylene-alpha,beta-dicarboxylic acid, the alkyl group of said amide containing at least 8 carbon atoms.

4. The emulsion of claim 1 wherein said emulsifier is a water-insoluble alkali metal salt of a copolymer of a major amount of monododecyl maleate and a minor amount of styrene.

5. The emulsion of claim 1 wherein said emulsifier is a water-insoluble alkali metal salt of a copolymer of a major amount of monooctadecyl maleate and a minor amount of styrene.

6. The emulsion of claim 1 wherein said emulsifier is a water-insoluble alkali metal salt of a copolymer of a major amount of monododecyl fumarate and a minor amount of styrene.

7. The emulsion of claim 1 wherein said emulsifier is a water-insoluble alkali metal salt of a copolymer of a major amount of maleic acid monostearylamide and a minor amount of styrene.

8. The emulsion of claim 1 wherein said emulsifier is a water-insoluble alkali metal salt of a copolymer of a major amount of maleic acid monooctadecyl ester and minor amounts of abietyl maleate, styrene, and butyl acrylate.

9. A process for the emulsification of a liquid polymerizable ethylenically unsaturated monomer in water with the aid of an emulsifier, which comprises agitating an aqueous solution of a base with a water-immiscible organic solution of the copolymer of 1–2 moles of styrene and about 1 mole of a polymerizable acid having the general formula R—CH=CX—COOH, wherein X is a member selected from the group consisting of hydrogen, alkyl and halogen, and R is a member selected from the group consisting of COOR'

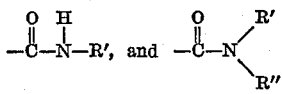

in which R' and R" stand for alkyl radicals containing at least 12 carbon atoms, whereby during the agitation a water-insoluble salt of the copolymer is formed and functions as an emulsifier; the solvent portion of said water-immiscible organic solution comprising a liquid polymerizable unsaturated monomer which is emulsified in said aqueous solution with the aid of said emulsifier.

10. Process of claim 9 wherein said copolymer is a copolymer of 1–2 moles of styrene with about 1 mole of a monoalkyl ester of an ethylene-alpha,beta-dicarboxylic acid and an alcohol of at least 8 carbon atoms.

11. Process of claim 9 wherein the water-immiscible organic solvent consists of a monoethylenically unsaturated monomer to which butadiene is added to form a copoylmer with said unsaturated monomer.

References Cited in the file of this patent

UNITED STATES PATENTS

| | | |
|---|---|---|
| 2,454,284 | Kirk | Nov. 23, 1948 |
| 2,537,018 | Barrett | Jan. 9, 1951 |
| 2,599,119 | McQueen | June 3, 1952 |
| 2,643,245 | Wilson | June 23, 1953 |
| 2,698,794 | Godowsky | Jan. 4, 1955 |